(12) United States Patent
Ohashi et al.

(10) Patent No.: US 9,080,102 B2
(45) Date of Patent: Jul. 14, 2015

(54) POROUS SCINTILLATOR CRYSTAL

(75) Inventors: Yoshihiro Ohashi, Tokyo (JP);
Nobuhiro Yasui, Yokohama (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/005,154

(22) PCT Filed: Mar. 22, 2012

(86) PCT No.: PCT/JP2012/058284
§ 371 (c)(1),
(2), (4) Date: Sep. 13, 2013

(87) PCT Pub. No.: WO2012/133603
PCT Pub. Date: Oct. 4, 2012

(65) Prior Publication Data
US 2013/0341512 A1 Dec. 26, 2013

(30) Foreign Application Priority Data

Mar. 30, 2011 (JP) ................................. 2011-074988
Mar. 12, 2012 (JP) ................................. 2012-054354

(51) Int. Cl.
*G01T 1/10* (2006.01)
*C09K 11/61* (2006.01)
*G21K 4/00* (2006.01)
(Continued)

(52) U.S. Cl.
CPC ............. *C09K 11/616* (2013.01); *C09K 11/615* (2013.01); *G01T 1/20* (2013.01); *G01T 1/202* (2013.01); *G21K 4/00* (2013.01); *Y10T 428/24273* (2015.01)

(58) Field of Classification Search
CPC ..................................................... G01T 1/2018
USPC ........................................................ 250/361 R
See application file for complete search history.

(56) References Cited

U.S. PATENT DOCUMENTS 3,838,273 A * 9/1974 Cusano ................... 250/214 VT
4,437,011 A * 3/1984 Noji et al. ................. 250/486.1
4,692,266 A * 9/1987 Costa et al. ............... 252/301.17
(Continued)

FOREIGN PATENT DOCUMENTS

CN    1550023 A    11/2004
CN    1910473 A    2/2007
(Continued)

OTHER PUBLICATIONS

J. Trojan-Piegza et al., "CaF2(Eu2+):LiF—Structural and Spectroscopic Properties of a New System for Neutron Detection," 45(2) Radiation Measurements 163-167 (Feb. 2010) (XP026984466).
(Continued)

*Primary Examiner* — Kiho Kim
(74) *Attorney, Agent, or Firm* — Fitzpatrick, Cella, Harper & Scinto

(57) ABSTRACT

A porous scintillator crystal capable of suppressing scattering of light that represents a high spatial resolution is provided. The porous scintillator crystal comprises a porous structure including voids, wherein the porous structure is a phase-separated structure having voids formed therein and comprises materials constituting a eutectic composition of the phase-separated structure and at least one void in the porous structure extend in a direction perpendicular to a principal plane of the porous scintillator crystal.

16 Claims, 5 Drawing Sheets

(51) Int. Cl.
  *G01T 1/20* (2006.01)
  *G01T 1/202* (2006.01)

(56) References Cited

U.S. PATENT DOCUMENTS

| | | | |
|---|---|---|---|
| 4,985,633 A | | 1/1991 | Vieux et al. |
| 5,449,449 A | | 9/1995 | Vieux et al. |
| 7,067,789 B2 | | 6/2006 | Yamagishi |
| 7,091,501 B2 * | | 8/2006 | Joly et al. .................. 250/484.4 |
| 7,297,294 B2 | | 11/2007 | Tahon et al. |
| 7,351,442 B2 | | 4/2008 | Tahon et al. |
| 7,718,986 B2 * | | 5/2010 | Yanagita et al. ............. 250/581 |
| 8,106,363 B2 * | | 1/2012 | Yip .......................... 250/370.09 |
| 8,586,931 B2 | | 11/2013 | Horie et al. |
| 8,618,489 B2 | | 12/2013 | Ohashi et al. |
| 8,669,527 B2 | | 3/2014 | Ueyama et al. |
| 8,779,373 B2 * | | 7/2014 | Takeda et al. ............ 250/370.11 |
| 2008/0099684 A1 | | 5/2008 | Murakami et al. |
| 2010/0127180 A1 * | | 5/2010 | Lifshitz et al. ................ 250/367 |
| 2011/0223323 A1 | | 9/2011 | Ohashi et al. |
| 2012/0292516 A1 | | 11/2012 | Yasui et al. |
| 2013/0026374 A1 | | 1/2013 | Saito et al. |
| 2013/0043402 A1 | | 2/2013 | Fukuda et al. |
| 2014/0084167 A1 | | 3/2014 | Ohashi et al. |
| 2014/0110587 A1 | | 4/2014 | Ohashi et al. |

FOREIGN PATENT DOCUMENTS

| | | |
|---|---|---|
| FR | 2634562 A1 | 1/1990 |
| JP | 7-18958 B2 | 3/1995 |
| JP | 2005-187817 A | 7/2005 |
| JP | 2007-155485 A | 6/2007 |
| JP | 2007-303876 A | 11/2007 |
| WO | 2010/132489 A2 | 11/2010 |
| WO | 2011/093176 A2 | 8/2011 |
| WO | 2011/136224 A1 | 11/2011 |
| WO | 2013/015438 A2 | 1/2013 |
| WO | 2013/015454 A2 | 1/2013 |

OTHER PUBLICATIONS

First Office Action in Chinese Application No. 201280015583.4 (dated Jun. 16, 2014).

Examination Report in European Application No. 12714871.6 (dated Oct. 14, 2014).

* cited by examiner

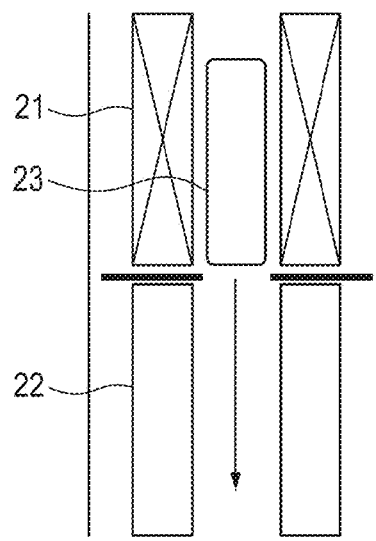 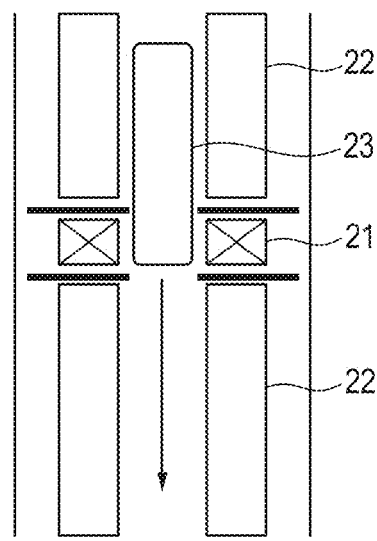
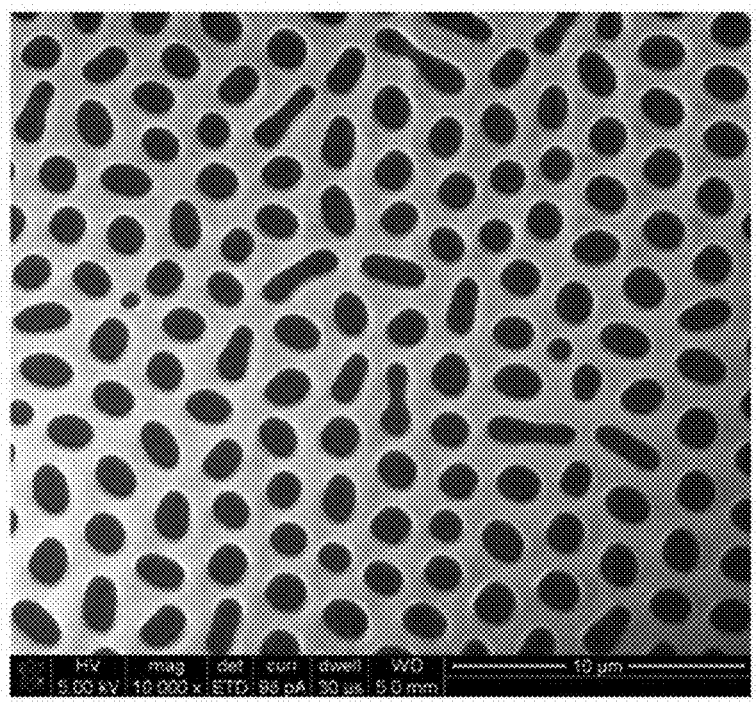

POROUS SCINTILLATOR CRYSTAL

TECHNICAL FIELD

The present invention relates to a scintillator, a material that emits light when excited by radiation. More particularly, the present invention relates to a porous scintillator crystal functionally capable of guiding light emitted from the scintillator to photodetectors and also to a method of manufacturing the same. The present invention also relates to a radiation detector using a porous scintillator crystal.

BACKGROUND ART

In a X-ray flat panel detector (FPD) to be employed in a clinical site, X-rays transmitted through a subject are received by scintillators and lights emitted from the scintillators are detected by photodetectors. The photodetectors are arranged in two-dimensional array and the scintillators are separated by voids so as not to give rise to any crosstalk of light. Light emitted from the inside of the scintillators is repeatedly reflected at the boundaries of the voids to suppress scattering of light in directions on a plane perpendicular to the travelling direction of light. As a result, a highly sharp radiation image can be obtained (see, PTLs 1 through 3).

For example, PTL 1 discloses a method of applying slurry which is prepared by dispersing a fluorescent material in water to a substrate, causing the slurry to freeze to form ice pillars in the slurry, subsequently removing the ice pillars and calcining the resultant substrate to produce voids in the slurry of the fluorescent material.

CITATION LIST

Patent Literatures

PTL 1: Japanese Patent Application Laid-Open No. 2007-155485.
PTL 2: Japanese Patent Publication No. H07-18958
PTL 3: Japanese Patent Application Laid-Open No. 2007-303876

SUMMARY OF INVENTION

Technical Problem

However, with the method disclosed in PTL 1, the scintillator part having voids is formed by sintered fine particles so that light generated in the scintillator passes through crystal grain boundaries for a plurality of times before reaching to the detector. Then, as a result, scattering of light takes place at their interfaces to give rise to a problem of degraded spatial resolution of the scintillator.

In view of the above-identified problem of the prior art, therefore, the object of the present invention is to provide a scintillator crystal that is a single crystal (phase-separated structural body) having voids formed therein and hence capable of suppressing scattering of light and represents a high spatial resolution.

Solution to Problem

According to the present invention, the above object is achieved by providing a porous scintillator crystal comprising a porous structure including voids, wherein the porous structure is a phase-separated structure having voids formed therein and comprises materials constituting a eutectic composition of the phase-separated structure and at least one void in the porous structure extend in a direction perpendicular to a plane of the porous scintillator crystal.

According to the present invention, there is also provided a radiation detector comprising a photodetector and a porous scintillator crystal arranged to face the photodetector, wherein the porous scintillator crystal comprises a porous structure including voids, the porous structure is a phase-separated structure having voids formed therein and comprises materials constituting a eutectic composition of the phase-separated structure, at least one void in the porous structure extend in a direction perpendicular to a plane of the porous scintillator crystal, and the void is arranged in such a way that the void is perpendicularly directed to the photodetector.

According to the present invention, there is also provided a method of manufacturing a porous scintillator crystal, comprising a step of forming a structural body including a phase-separated structure having a plurality of first crystal phases with unidirectionality and a second crystal phase covering lateral surfaces of the first crystal phases and a step of removing the first crystal phases of the structural body.

Advantageous Effects of Invention

Thus, according to the present invention, a scintillator crystal having voids formed in a single crystal (phase-separated structural body) can be obtained. Then, as a result, such a scintillator crystal does not have any crystal interface that can induce scattering of light so that light generated in the scintillator crystal is efficiently guided to photodetectors and hence a highly sharp radiation image can be obtained.

Further features of the present invention will become apparent from the following description of exemplary embodiments with reference to the attached drawings.

BRIEF DESCRIPTION OF DRAWINGS

FIG. 3A is a schematic cross-sectional view of an apparatus for manufacturing a porous scintillator crystal according to the present invention.

FIG. 3B is another schematic cross-sectional view of an apparatus for manufacturing a porous scintillator crystal according to the present invention.

FIG. 4 is an image of a cross section of a CuI—KCl system phase-separated structure as observed through a scanning electron microscope.

DESCRIPTION OF EMBODIMENTS

Figure 1:
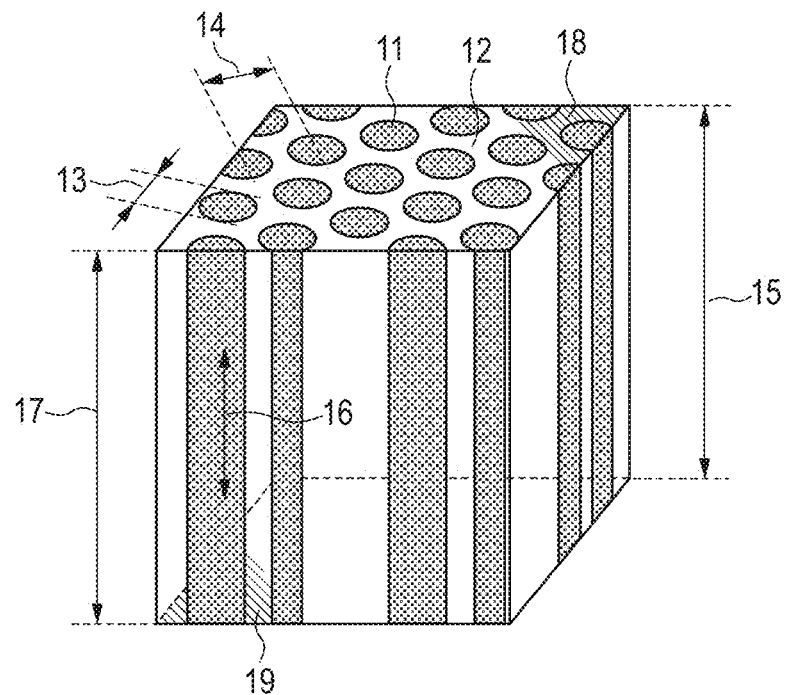
FIG. 1 is a schematic illustration of an exemplar porous scintillator crystal according to the invention.

Now, embodiments of the present invention will be described below by referring to the accompanying drawings. Note that, while the present invention can be embodied in various different ways (in terms of configuration and material), all embodiments commonly include a porous scintillator crystal that includes a porous structure having voids, in which the porous structure is a phase-separated structure having voids formed therein and includes materials constituting a eutectic composition of the phase-separated structure and at least one void in the porous structure extend in a direction perpendicular to a principal plane of the porous scintillator crystal. With such an arrangement, the light propagating through the porous scintillator crystal is totally reflected by the voids in the porous structure of the porous scintillator crystal. Then, as a result, the light is guided to travel in the porous scintillator crystal. A porous scintillator crystal can be manufactured by forming voids in a phase-separated structure. A phase-separated structure can be manufactured as a single crystal and, if a phase-separated structure is a perfect single crystal, no crystal interface that gives rise to scattering of the light exists in the crystal. In short, it is preferable that the porous structure of a porous scintillator crystal is a phase-separated structure having voids formed therein and contains one of the materials constituting a eutectic composition of the phase-separated structure, and is a single crystal. Additionally, a porous scintillator crystal has parts where the single crystal is exposed to both the first principal plane and the second principal plane that are not located on a same plane in the crystal. These exposed parts form a matrix that continuously surrounds the outer peripheries of the voids. Since the voids extend in the direction perpendicular to the first principal plane or the second principal plane, the light is guided toward the first principal plane or the second principal plane. In other words, the light generated in the porous scintillator crystal travels toward the first principal plane or the second principal plane while being confined the inside of the porous scintillator crystal (and hence the light is not spread). Thus, in all the embodiments of the present invention, the porous scintillator crystal itself has a light guiding function.

Note that, in each of the embodiments that will be described hereinafter, a porous scintillator crystal is preferably configured that the porous scintillator crystal has parts where each of the voids is exposed respectively to the first principal plane and the second principal plane and the voids extend perpendicularly relative to the first principal plane of the porous scintillator crystal so as to run through from the first principal plane to the second principal plane. Additionally, single crystalline of the porous scintillator crystal has preferably not less than 90%, more preferably 100%, of the total volume of the porous structure. With such an arrangement, the light generated in the porous scintillator crystal can be guided more reliably to the first principal plane or the second principal plane without spreading.

Configuration of Porous Scintillator Crystal

FIG. 1 is a schematic illustration of an exemplar porous scintillator crystal according to the present invention. A porous scintillator crystal that is a porous structure having voids according to the present invention has a first principal plane 18 and a second principal plane 19 that are not located on a same plane and both the first principal plane 18 and the second principal plane 19 have parts to which the single crystal is exposed. The porous scintillator crystal has at least one void 11 that extend in the direction perpendicular to the first principal plane 18 of the porous scintillator crystal 12 in the inside of the porous scintillator crystal 12. The porous structure is formed by a eutectic composition of the phase-separated structure. The void diameter 13 is preferably found within a range of not less than 50 nm and not more than 30 μm and the average of the nearest-neighbor distances 14 of the voids is preferably found within a range of not less than 500 nm and not more than 50 μm. The light generated in the porous scintillator crystal reaches to photodetectors while being reflected by the interfaces of the voids. If the structural period of voids is smaller than the wavelength of the light, the component of light that is transmitted without being reflected increases. Therefore, the lower limit value of the nearest-neighbor distance 14 of the voids is desirably greater than the wavelength of generated light. The nearest-neighbor distance 14 of the voids is desirably not less than 500 nm because photodetectors which are sensitive for light having a wavelength of not less than 500 nm are employed for the purpose of the present invention. On the other hand, the upper limit value for the nearest-neighbor distance 14 of the voids is desirably smaller than the size of one pixel of a photodetector because the effect of confining light in one pixel is reduced when the nearest-neighbor distance 14 of the voids exceeds the size of one pixel. Since photodetectors in which each pixel has a 50 μm square pixel size are employed for the purpose of the present invention, the nearest-neighbor distance 14 of the voids is desirably not greater than 50 μm. On the other hand, the void diameter 13 is determined depending on the nearest-neighbor distance 14 of the voids. The light confinement effect is boosted as the void diameter 13 becomes large relative to the nearest-neighbor distance 14 of the voids. The void diameter 13 is preferably about 60% of the nearest-neighbor distance 14 so as to arrange voids in close packing. When the upper limit value for the nearest-neighbor distance 14 of the voids is 50 μm, the void diameter 13 is desirably 30 μm. When, on the other hand, the lower limit value for the nearest-neighbor distance 14 of the voids is 500 nm and the void diameter 13 is too large, the structural period of void interfaces that operate as light reflecting surfaces becomes smaller than the wavelength of light so that the component of light that is transmitted without being reflected increases. Therefore, when the nearest-neighbor distance 14 of the voids is 500 nm and hence equal to the lower limit value, the void diameter 13 is desirably 50 nm. In short, the void diameter 13 is preferably within a range of not less than 50 nm and not more than 30 μm and the average of the nearest-neighbor distances 14 of the voids is preferably within a range of not less than 500 nm and not more than 50 μm. When, however, a porous scintillator crystal according to the present invention is combined with detectors or a detector array, the porous scintillator crystal that is combined with such photodetectors is preferably such that the porous scintillator crystal has a structural size so as to arrange a large number of voids to face light receiving regions of the photodetectors. A nearest-neighbor distance of the voids as used herein refers to the distance of the line connecting the centers of two neighboring voids. When the light receiving region of a photodetector is a 20 µm square, a porous scintillator crystal whose structural size is such that void diameter is 5 µm and the average of the nearest-neighbor distances of the voids is 8 µm is preferably combined with such photodetectors. Thus, photodetectors are preferably combined with a porous scintillator crystal having a structural size smaller than the light receiving region of the photodetectors, in accordance with the size of the light receiving region.

Figure 2:
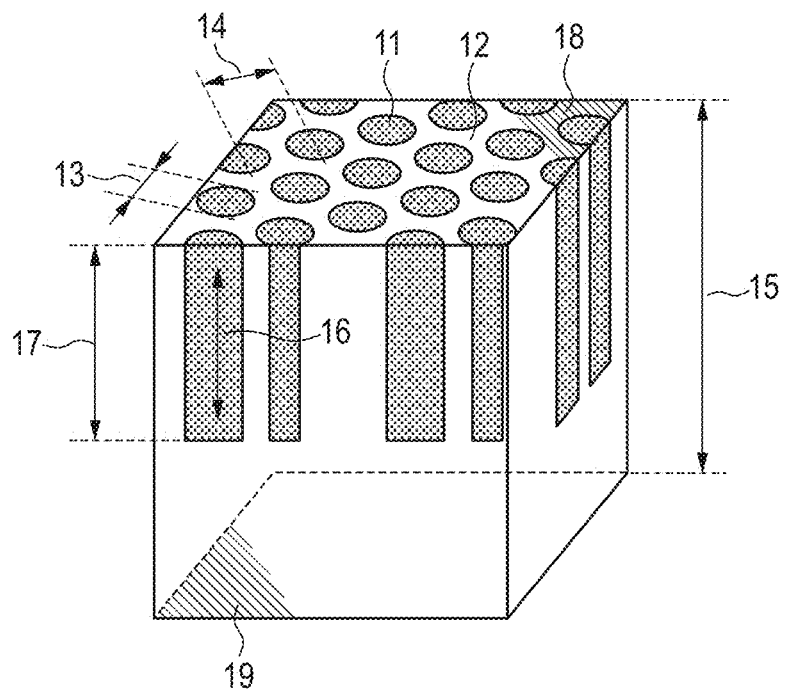
FIG. 2 is a schematic illustration of another exemplar porous scintillator crystal according to the present invention.

The thickness 15 of the porous scintillator crystal can be adjusted to any desired value although the thickness may depend on the manufacturing method. The voids are preferably linearly continuous in the direction 16 of the thickness of the voids, although the present invention does not eliminate instances where some of the voids are discontinued and/or branched somewhere between the opposite ends thereof, instances where a plurality of voids are combined, instances where the diameters of some of the voids vary and/or instances where some of the voids are not linear but have one or more non-linear parts. The thickness 17 of the voids can be adjusted to any value relative to the thickness 15 of the porous scintillator crystal. As illustrated in FIG. 1, the voids 11 may run through from the first principal plane 18 to the second principal plane 19 of the porous scintillator crystal 12. Alternatively, as illustrated in FIG. 2 schematically illustrating another exemplar porous scintillator crystal according to the present invention, the thickness 17 of the voids may be smaller than the thickness 15 of the porous scintillator crystal and the porous scintillator crystal may have voids only in a part thereof. Voids may be introduced from either the first principal plane 18 or the second principal plane 19 that is not located on the first principal plane 18 by a desired thickness, or from both the two principal planes. When a porous scintillator crystal has voids in a part thereof as illustrated in FIG. 2, voids are preferably introduced from the principal plane side that X-rays enter. As X-rays enter the porous scintillator crystal 12, X-rays are exponentially absorbed along the direction of the thickness of the porous scintillator crystal so that the porous scintillator crystal is excited by X-rays to emit light. Thus, the effect of the present invention can be sufficiently achieved and spreading of light emission is suppressed when voids are introduced from the side that receives incident X-rays and emits more light.

A porous scintillator crystal having voids according to the present invention is preferably that at least one void 11 are formed in the inside of the porous scintillator crystal 12 that is a single crystal.

As for the material of a porous scintillator crystal according to the present invention, any material that can be applied as a scintillator may be used for the purpose of the present invention. A luminescent center substance may be or may not be added to the porous scintillator crystal depending on the application of the porous scintillator crystal according to the present invention.

Method of Manufacturing Porous Scintillator Crystal

A suitable method of manufacturing a porous scintillator crystal according to the present invention will be described below. Note, however, any other method that can form an equivalent porous scintillator crystal may alternatively be used for the purpose of the present invention.

1. Step of Forming a Structural Body Having a Phase-Separated Structure

Any method of unidirectionally melting and solidifying a desired material system having an optimum composition may be used for manufacturing a porous scintillator crystal according to the present invention. A structural body having a phase-separated structure is formed in a preliminary stage for manufacturing a porous scintillator crystal.

The term "an optimum composition" as used herein refers to a composition that is same as or close to a eutectic composition that can form a phase-separated structure as illustrated in FIG. 4. FIG. 4 is an image of a cross section of a structural body having a phase-separated structure including two phases manufactured with a composition ratio (eutectic composition) of CuI and KCl respectively equal to 70 mol % and 30 mol % as observed through a scanning electron microscope. The dark areas in FIG. 4 illustrate the KCl crystal phase, whereas the light areas covering the lateral surfaces of the KCl crystal phase represent the CuI crystal phase. An optimum composition is preferably within a range of the eutectic composition ±5 mol %. In other words, the composition ratio X' (mol %) of the first composition and the composition ratio Y' (mol %) of the second composition respectively satisfy the following formulas. If the composition ratio of the first composition is X (mol %) and the composition ratio of the second composition is Y (mol %) in a eutectic composition of the first composition and the second composition, $(X-5) \leq X' \leq (X+5)$ and $X'+Y'=100$.

The reason for defining the above range of optimum composition is that the above materials represent an eutectic relation when forming a phase-separated structure of a porous scintillator crystal and a structural body having a high quality phase-separated structure as illustrated in FIG. 4 can be obtained by unidirectionally solidifying the above materials with a composition ratio that is same as or close to the eutectic composition. Outside the above-described range of optimum composition, or when the composition ratio is out of the range of the eutectic composition ±5 mol %, one of the crystal phases is earlier precipitated to produce a cause of disturbing a good phase-separated structure of a porous scintillator crystal from the viewpoint of forming a phase-separated structure.

When a plurality of phases constituting the dark areas of a structural body having a phase-separated structure as illustrated in FIG. 4 are referred to as the first crystal phases, while the phase constituting the light area surrounding the dark areas is referred to as the second crystal phase, the porous scintillator crystal are preferably manufactured by any of the combinations of materials or the material systems as represented in Table 1 with the optimum composition of the combination. More specifically, a combination of CuI—NaCl, a combination of CuI—KCl and a combination of CsBr—NaBr can be used for the purpose of present invention. One or more materials other than the above-described materials may be added respectively to the first crystal phases and the second crystal phase. When one or more materials other than that are added to the material constituting the first crystal phases, preferably the material is such that a solid solution can be produced for the first crystal phases but no solid solution can be produced for the second crystal phase with the composition obtained after adding the material. Such a material may be NaBr when added to NaCl that is the material of the first crystal phases.

While only some exemplar material systems are represented herein, any material systems may be adopted so long as they can suitably form a phase-separated structure. Note, however, that at least the second crystal phase functions as scintillator and emits light when excited by radiation.

TABLE 1

| First crystal phase:Second crystal phase | eutectic composition [mol %] |
|---|---|
| NaCl:CuI | 10:90 |
| KCl:CuI | 30:90 |
| NaBr:CsBr | 41:59 |

When manufacturing a structural body having a phase-separated structure, the temperature gradient of the introduced sample lot of the materials is required to be so controlled as to make the solid/liquid interface of the sample smooth along a plane perpendicular to the moving direction of the heater and/or the sample and the temperature gradient is preferably about or higher than 30° C./mm. Note that, the temperature gradient may be reduced within a range that does not provide any obstacle to the formation of the phase-separated structure of the porous scintillator crystal of each embodiment of the present invention in order to prevent any risk of generation of defects such as cracks due to thermal stress to the crystal in the crystal phases. The porous scintillator crystal may desirably be reheated to such an extent that the part thereof that has turned to the above-described structural body may not be melted in order to suppress or eliminate the defects such as cracks. The range of composition in which the eutectic composition of the phase-separated structure of a porous scintillator crystal according to the present invention can be achieved is the eutectic composition ±5 mol % as described above. A porous scintillator crystal according to the present invention should be manufactured so as to be found within a category referred to as coupled eutectic zone where a correlation specific to the material system holds true among the above composition range, the temperature gradient and the solidification rate which will be described hereinafter.

FIGS. 3A and 3B illustrate cross-sectional views of an apparatus for manufacturing a porous scintillator crystal according to the present invention. This apparatus employs the Bridgman method and the sample that contains the materials sealing in a cylindrical container such as a quartz tube so as not to allow the materials to be oxidized is arranged vertically in the apparatus. Then, a porous scintillator crystal according to the present invention can be manufactured since the position of the solidification interface of the sample can be controlled by moving the heater and/or the sample vertically in a constant direction at a constant speed. As an example, FIGS. 3A and 3B illustrate an apparatus designed to move the samples 23 vertically downward in a constant direction. As illustrated in FIG. 3A, the apparatus includes a heater section 21 that corresponds to the length in vertical direction of the sample 23 and a water cooling section 22 arranged below the heater section 21 to realize a temperature gradient of 30° C./mm for the solid/liquid interface. Alternatively, as illustrated in FIG. 3B, the water cooling section 22 may include an upper water cooling section and a lower water cooling section and the heater section 21 is arranged between the upper and lower cooling sections so that the heater section 21 corresponds only to a part of the length in vertical direction of the sample 23. A porous scintillator crystal according to the present invention can also be manufactured by some other equivalent method.

A porous scintillator crystal according to the present invention can also be manufactured by means of a method of pulling up a crystal out of a melt such as the Czochralski method. Since this method does not involve solidification of the melt of the materials in a container unlike the Bridgman method, this method may be more preferable from the viewpoint that a solid/liquid interface of the materials can be formed without being affected by the wall surface of the container. The floating zone method can also be used to manufacture a porous scintillator crystal according to the present invention.

Particularly with the Bridgman method, the solidification rate needs to be so adjusted as to make the solid/liquid interface of the sample as planar as possible along a vertical plane that is perpendicular to the moving direction of the heater and/or the sample. However, the heat exchange between the sample being solidified and the outside is realized mainly along the lateral surface of the sample. Therefore, the solidification rate depends on the diameter of the sample. In other words, the heat exchange takes time when the diameter of the sample is large. Then, the solid/liquid interface becomes curved to a large extent unless the solidification rate is reduced and then columnar crystals that are the first crystal phases are formed nonlinearly along a direction in most of the region of the sample. This is because the growing direction of columnar crystals is subsequently perpendicular to the solid/liquid interface. Furthermore, when the solidification rate is greater relative to the size of the sample, the solid/liquid interface can be held neither smooth nor planar. Then, as a result, microscopic undulations arise along the moving direction of the heater and/or the sample to give rise to a situation where dendrite crystals are produced but such a situation needs to be avoided. Therefore, a satisfactory temperature gradient of the solid/liquid interface needs to be adjusted and, at the same time, the solidification rate is preferably not greater than 850 mm/h, more preferably not greater than 500 mm/h, most preferably not greater than 300 mm/h.

The diameter of the first crystal phases of the structural body having a phase-separated structure and the average of the periods of the nearest-neighbor distances of the first crystal phases are dependent on the solidification rate. Particularly, the period of the nearest-neighbor distance is believed to represent a correlation expressed by the formula represented below. Namely, if the period is $\lambda$ and the solidification rate is v, $\lambda^2 \cdot v =$ constant. Therefore, when a desired period is selected, the solidification rate is necessarily defined to a limited value. However, the range of the average of the period $\lambda$ is not less than 500 nm and not more than 50 µm when a solidification rate that makes the solid/liquid interface planar and smooth is taken into consideration as a limitation to the manufacturing method as pointed out above. Then, correspondingly, the range of the diameter of the first crystal phases is not less than 50 nm and not more than 30 µm. The diameter of the first crystal phases also refers to instances where the cross section of the first crystal phases is not circular. For example, if the first crystal phases represent an indeterminate form, the shortest distances across the respective cross sections of the first crystal phases need to be found within the above range. The average ratio of the largest diameter and the shortest diameter of the first crystal phases that are of a large number is preferably not greater than 10. When the average ratio is greater than 10, a lamella structure may appropriately be selected for them. However, even if some of the ratios of the diameters of the plurality of first crystal phases are greater than 10, they are permissible so long as the average ratio is not greater than 10. Additionally, since a lamella structure can be formed more easily when the composition ratio of the materials of the two phases is closer to 1:1 in terms of mol ratio from the viewpoint of manufacturing conditions, the manufacturing conditions and the material(s) to be added are preferably selected so as not to form a lamella structure.

Now, the starting composition of the source materials will be described below. Table 1 represents the composition ratios of the above-described structural body having a phase-separated structure but the starting composition may be out of the range of the eutectic composition ±5 mol %. More specifically, with the Bridgman method, when the entire sample is solidified from a molten state in a direction, the substance that is in excess of the eutectic composition is earlier precipitated in the initial stage of solidification and therefore, as a result, the remaining melt represents the eutectic composition. With the Czochralski method, the substance that is in excess of the eutectic composition is pulled up in the initial stages of the pulling up operation so that preferably a dummy pulling up operation is conducted once and a proper pulling up operation is conducted after the melt comes to represent the eutectic composition. Any unnecessary parts may be separated after the formation of a structural body.

2. Step of Removing the First Crystal Phases from the Structural Body Having a Phase-separated Structure A porous scintillator crystal having a porous structure that contains voids according to the present invention is obtained by removing the first crystal phases from the structural body having a phase-separated structure. The porous structure includes a eutectic composition for a phase-separated structure. While almost all the first crystal phases of the structural body may be removed, preferably the first crystal phases in a desired region are removed to a desired thickness.

As for the method of removing the first crystal phases, when the first crystal phases are dissolved preferentially, the first crystal phases are preferably dissolved and removed by using an optimum solution. When a substance selectively reacts with the first crystal phases, the first crystal phases are preferably removed by way of such a reaction. Such a reaction may be conducted either in a liquid phase or in a gas phase.

Now, the material systems listed in Table 1 will be described below.

Figure 5A:
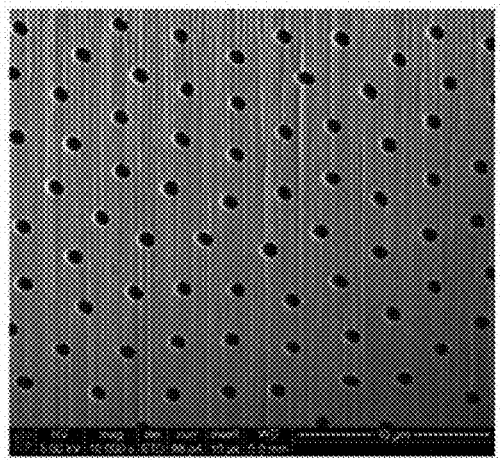
FIG. 5A is an image of a cross section of a porous scintillator crystal according to the present invention as observed through a scanning electron microscope.
Figure 5B:
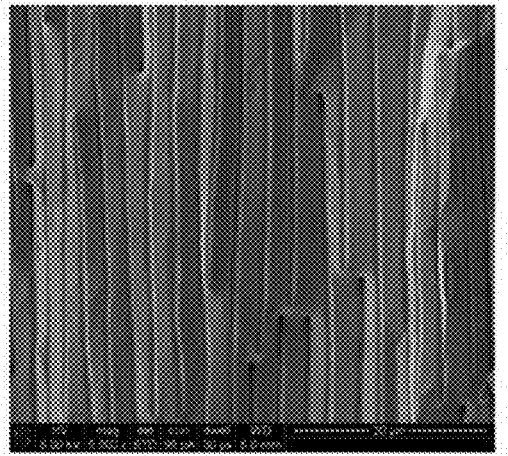
FIG. 5B is another image of a cross section of a porous scintillator crystal according to the present invention as observed through a scanning electron microscope.
Figure 5C:
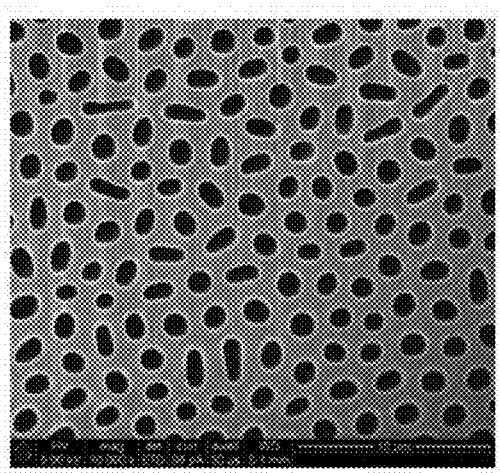
FIG. 5C is still another image of a cross section of a porous scintillator crystal according to the present invention as observed through a scanning electron microscope.
Figure 5D:
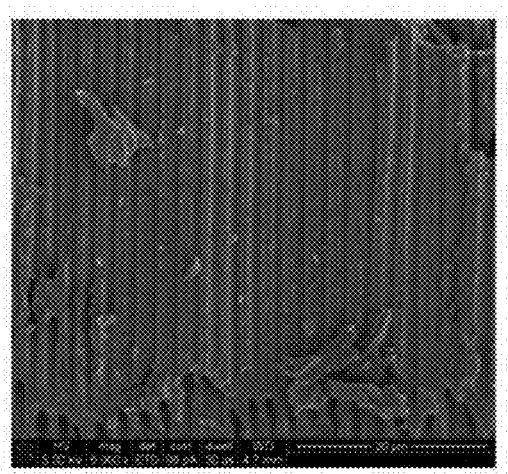
FIG. 5D is still another image of a cross section of a porous scintillator crystal according to the present invention as observed through a scanning electron microscope.

In the case of the CuI—NaCl system or the CuI—KCl system, for example, the NaCl crystal phases or the KCl crystal phases can be removed efficiently by utilizing the low solubility of CuI in water. FIG. 5A illustrates a SEM image of a cross section of a porous CuI scintillator crystal, from which NaCl crystal phases have been removed, as taken along the first principal plane of the scintillator crystal. FIG. 5B illustrates a SEM image of a cross section of a porous CuI scintillator crystal, from which NaCl crystal phases have been removed, as taken along a plane perpendicular to the first principal plane of the scintillator crystal. FIG. 5C illustrates a SEM image of a cross section of a porous CuI scintillator crystal, from which KCl crystal phases have been removed, as taken along the first principal plane of the scintillator crystal. FIG. 5D illustrates a SEM image of a cross section of a porous CuI scintillator crystal, from which KCl crystal phases have been removed, as taken along a plane perpendicular to the first principal plane of the scintillator crystal. The voids of the porous CuI scintillator crystal represent unidirectionality and extend in a direction perpendicular to the first principal plane of the scintillator crystal. Thus, in the case of the porous CuI scintillator crystals that are each made of same substances and manufactured respectively from the CuI—NaCl system and the CuI—KCl system, a porous scintillator crystal having a porous structure containing voids of varied shapes can be manufactured. The diameter of the voids and the period of the nearest-neighbor distance, which respectively correspond to the diameter and the period of the nearest-neighbor distance of the first crystal phases of the structural body having the phase-separated structure, can be changed by using a different material system and different manufacturing conditions for the structural body having the phase-separated structure.

In the case of the CsBr—NaBr system, since both the CsBr crystal phase and the NaBr crystal phase are highly soluble to water, no water can be utilized unlike the instance where CuI is contained. Therefore, an etching operation using methanol that selectively dissolves and reacts with one of the crystal phases is preferably employed. Then, the NaBr crystal phases that correspond to the first crystal phases are preferentially dissolved and hence a porous CsBr scintillator crystal is manufactured. While the size of the structural body before the etching operation may be reduced as a result of the dissolving step, such a size reduction is permissible so long as the structure of the porous scintillator crystal according to the present invention is maintained. Other material systems that can be used to manufacture a structural body having a phase-separated structure that can be employed for a porous scintillator crystal include the CsI—NaCl system, the CsI—KCl system, the CsBr—NaBr system and so on. High quality porous scintillator crystal can expectedly be formed if NaCl, KCl, NaBr and so on can be removed by means of appropriate respective solvents.

Applications of Porous Scintillator Crystal

A porous scintillator crystal according to the present invention can find applications in the field of radiation detectors for medical, industrial, high energy physical, and aerospace in combination with photodetectors. Particularly, a porous scintillator crystal according to the present invention has a light guiding function without any partitions and hence may suitably be used in a situation where light needs to be guided in a specific direction toward photodetectors. Further, a porous scintillator crystal according to the present invention can effectively be used in an X-ray CT scanner that requires partitions or as an alternative for the CsI needle crystal of an X-ray flat panel detector (FPD). In the cases, in order to adjust to the characteristic of light sensitivity of photodetectors, the wavelength of light that is emitted as a porous scintillator crystal is excited by radiation can be adjusted by adding one or more materials and/or adding a luminescence center substance to the light emitting phase.

A porous scintillator crystal is arranged in such a way that the one or more voids with unidirectionality are perpendicularly directed to the photodetectors. Preferably, a film or a layer that operates as protection or antireflection is arranged between photodetectors and a porous scintillator crystal according to the present invention, and the photodetectors and the porous scintillator crystal are bonded to each other or arranged via such a film or a layer.

EXAMPLE 1

This example represents a method of manufacturing a porous scintillator crystal according to the present invention to evidence that such a porous scintillator crystal can be manufactured.

Firstly, each of the material systems of CuI—NaCl, CuI—KCl and CsBr—NaBr was weighed for the eutectic composition thereof and sealed in a quartz tube. As represented in Table 1, NaCl was 10 mol % relative to CuI for the CuI—NaCl system, KCl was 30 mol % relative to CuI for the CuI—KCl system, and NaBr was 41 mol % for the CsBr—NaBr system. No luminescent center substance was added to the CuI—NaCl system and the CuI—KCl system in order to manufacture self-luminescent scintillators that were free from any luminescent center substance, whereas In was added by 0.1 mol to the CaBr—NaBr system as a luminescent center substance.

Then, each of the weighed systems was set in the Bridgman furnace having the configuration as illustrated in FIG. 3A and the temperature thereof was raised to 800° C. to melt the material. The melted material was held in melt state for 30 minutes and then pulled down so as to solidify gradually from the bottom part of the material (unidirectional solidification) to form a structural body having a phase-separated structure. The material was pulled down and then entered into the region of the water-cooling section where cooling water was circulated in the furnace so as to make the temperature difference between the melted part of the material and the part entered into the region of the water-cooling section not less than 30° C./mm.

The structural body having a phase-separated structure formed in this way was cut to a thickness of 1 mm along a plane perpendicular to the direction of pulling down the materials and hence to the direction of solidification, and the cut surface was observed through a scanning electron microscope (SEM). FIG. 4 illustrates the image of the structural body of the CuI—KCl system obtained through a SEM. In the image of FIG. 4, the dark areas were the KCl crystal phases and the light area was the CuI crystal phase. Thus, the structural body formed a phase-separated structure in which the CuI crystal phase part covers the lateral surfaces of the plurality of KCl crystal phases that were columnar crystals. Similarly, in the CuI—NaCl system, the structural body formed a phase-separated structure in which the CuI crystal phase part surrounds the plurality of NaCl crystal phases that were columnar crystals. Further, in the CsBr—NaBr system, the structural body formed a phase-separated structure in which the CsBr crystal phase part covers the lateral surfaces of the plurality of NaBr crystal phases that were columnar crystals.

Figure 6:
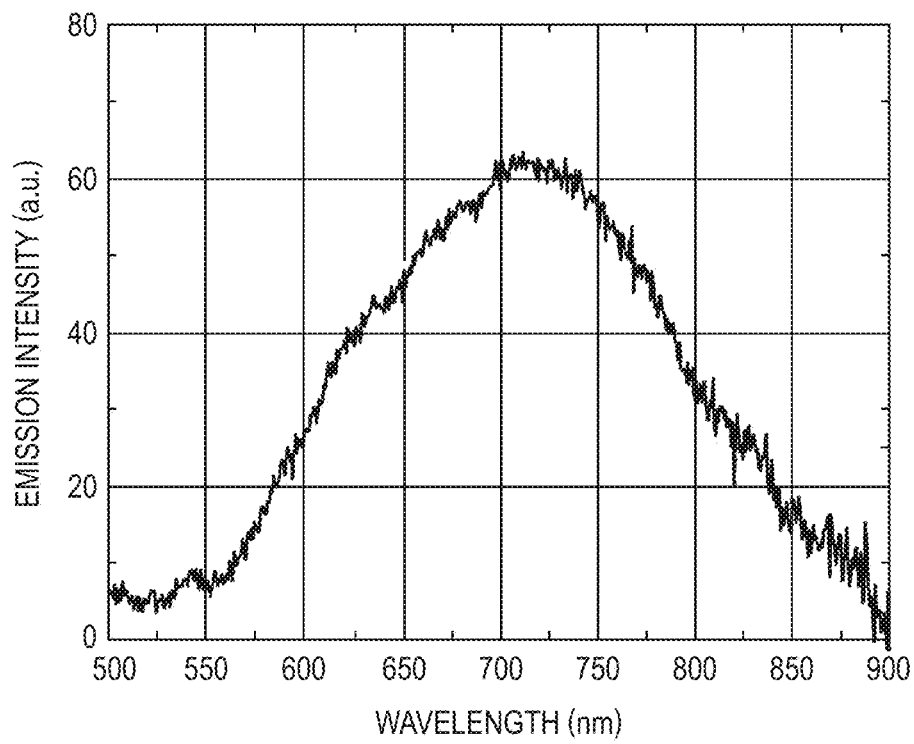
FIG. 6 is an emission spectrum of a CuI-based porous scintillator crystal that emits light when excited by X-rays.

The CuI—NaCl system structural body and the CuI—KCl system structural body that had been cut to a thickness of 1 mm were put into pure water at room temperature for 20 minutes for the purpose of etching. FIGS. 5A to 5D illustrate the images observed through a scanning electron microscope (SEM) of the etched CuI—NaCl system structural body and the etched CuI—KCl system structural body that were porous scintillator crystals. FIG. 5A illustrates a SEM image of a cross section running in parallel with the first principal plane of the porous CuI scintillator crystal obtained by removing the NaCl crystal phases. FIG. 5B illustrates a SEM image of a cross section perpendicular to the first principal plane of the porous CuI scintillator crystal obtained by removing the NaCl crystal phases. FIG. 5C illustrates a SEM image of a cross section running in parallel with the first principal plane of the porous CuI scintillator crystal obtained by removing the KCl crystal phases. FIG. 5D illustrates a SEM image of a cross section perpendicular to the first principal plane of the porous CuI scintillator crystal obtained by removing the KCl crystal phases. Note that FIGS. 5A and 5B illustrate the porous CuI scintillator crystal originating from the CuI—NaCl system, whereas FIGS. 5C and 5D illustrate the porous CuI scintillator crystal originating from the CuI—KCl system. All the SEM images of the cross sections of the porous scintillator crystals prove that the porous scintillator crystals were obtained by removing only the NaCl crystal phases and the KCl crystal phases that were columnar crystal parts of the phase-separated structures to form voids in an etching step. That a large number of voids representing unidirectionality and extending along the direction perpendicular to the first principal plane had been formed could be confirmed. FIGS. 5B and 5D illustrate that the CuI crystal phase was not sintered polycrystal but crystal body made of substantially single crystal relative to the direction along which the voids extend that was the direction perpendicular to the first principal plane. A step structure of a cleavage plane of a crystal that is occurred when a sample is cleaved was confirmed in the cross-sectional SEM images of each material system and hence there are parts where the CuI crystal phase may appear to be polycrystal. However, focusing on the lateral surface regions of the voids, in other words, the parts removing the columnar crystals, the smoothness of the lateral surface regions of the voids indicates that the CuI crystal phase was single crystal. FIG. 6 illustrates the emission spectrum obtained by irradiating the obtained porous scintillator crystal with X-rays (tube voltage: 60 kV, 1 mA). The CsBr—NaBr system structural body was etched by methanol at room temperature for 20 minutes from the end face of the lateral side thereof. An observation through a SEM proved that the porous scintillator crystal had been obtained by removing only the NaBr crystal phases that were columnar crystal parts of the phase-separated structure to form voids in an etching step as in the case of the CuI—NaCl system and the CuI—KCl system. That the NaBr crystal phases had been etched by about 0.25 mm depth from the end face of the lateral side and the rest of the region was the CsBr—NaBr system that was the matrix was also confirmed. Thus, that voids can be formed in a porous scintillator crystal according to the present invention not by removing the whole columnar crystals but only part of the columnar crystals.

Thus, this example proves that a porous scintillator crystal according to the present invention can be manufactured.

EXAMPLE 2

This example relates to the excellent light guiding property of a porous scintillator crystal according to the present invention.

The porous scintillator crystals having the porous structure originating respectively from the CuI—NaCl system, the CuI—KCl system and the CsBr—NaBr system manufactured in Example 1 were prepared. The crystal originating from the CuI—NaCl system had a void ratio of 8% and a thickness of 1 mm. The crystal originating from the CuI—KCl system had a void ratio of 32% and a thickness of 1 mm. The crystal originating from the In-doped CsBr—NaBr system had voids formed from the end face of the lateral side thereof to a depth of 0.25 mm of the thickness of 1 mm, the void ratio of the region where the voids were formed being 32%, the rest of the region of the crystal having the eutectic composition of the CsBr—NaBr system phase-separated structure. Note that each of the void ratios was determined by analyzing the SEM image of the surface obtained by cutting the porous scintillator crystal in a direction perpendicular to the direction of the voids.

Figure 7:
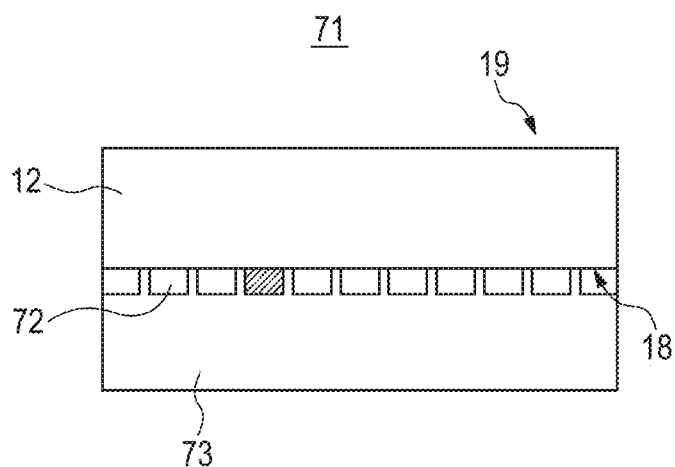
FIG. 7 is a schematic cross-sectional view of a radiation detector according to the present invention.

FIG. 7 is a schematic cross-sectional view of a radiation detector according to the present invention. The porous scintillator crystal 12 was arranged on photodetectors 72 arranged in array on a substrate 73 in such a way that the voids were substantially perpendicularly directed to the photodetectors 72 to form a radiation detector 71. In other words, the porous scintillator crystal 12 was arranged in such a way that the first principal plane 18 faced the photodetectors 72. Note, however, as for the CsBr—NaBr system porous scintillator crystal, the porous scintillator crystal was arranged in such a way that the surface where no voids were formed faces and contacts with the photodetectors 72. No reflection layer was formed for the crystals in order to measure the proper resolutions of the crystals.

As Comparative Example, a sample of Tl-doped CsI needle crystal that was equivalent to the one in the comparative example of PTL 1 was prepared by means of an evaporation method because the inventors of the present invention could not prepare a sample having the structure as disclosed in PTL 1 with ease. The sample was prepared so that the thickness of the crystal film thereof was 430 µm and no reflection film was formed in order to measure the proper resolution of the crystal. The void ratio of the crystal film of the sample in Comparative Example was about 20%.

Figure 8A:
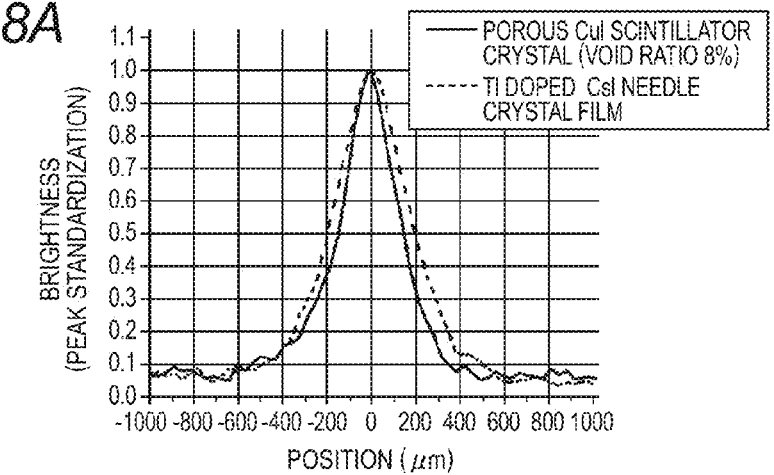
FIG. 8A is a graph illustrating the emitted light propagation characteristics of a porous scintillator crystal according to the present invention.
Figure 8B:
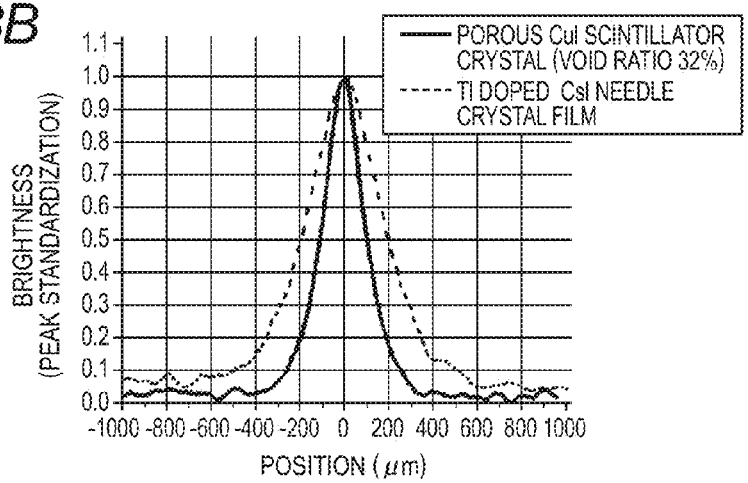
FIG. 8B is another graph illustrating the emitted light propagation characteristics of a porous scintillator crystal according to the present invention.
Figure 8C:
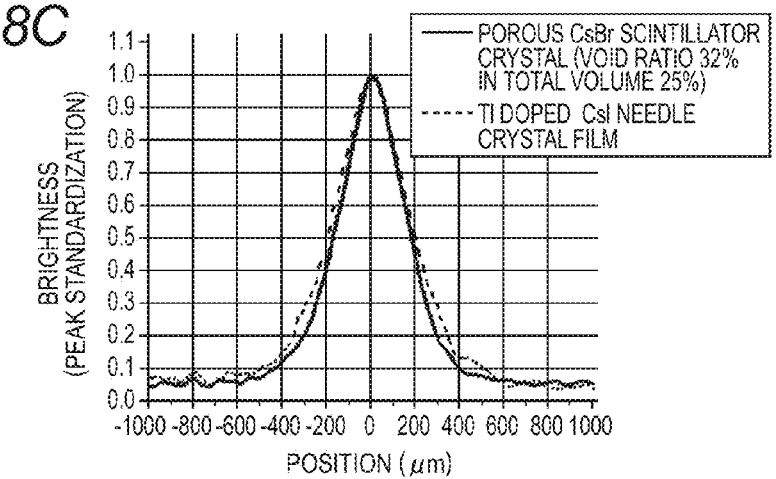
FIG. 8C is still another graph illustrating the emitted light propagation characteristics of a porous scintillator crystal according to the present invention.

A tungsten vacuum tube was employed as X-ray source. X-rays obtained under the conditions of 60 kV, 1 mA and no Al filter was irradiated on each of the objects to be measured through an aperture having a diameter of 100 µm of a 2 mm-thick tungsten plate to observe the light intensity distribution at the bottom surface of the object to be measured. X-rays was irradiated in a direction perpendicular to the first principal plane. CCDs arranged at a pitch of 50 µm were used to observe emitted light. FIGS. 8A to 8C illustrate the light intensity profiles of the cross section, which contain the respective peak values of the light intensity distributions of the samples. The profiles were standardized by peak brightness. FIG. 8A illustrates the light intensity profile of the porous CuI scintillator crystal having a void ratio of 8%, FIG. 8B illustrates the light intensity profile of the porous CuI scintillator crystal having a void ratio of 32%, and FIG. 8C illustrates the light intensity profile of the porous CsBr scintillator crystal where voids were formed in a region occupying 25% of the entire volume of the crystal and the region had a void ratio of 32%. The half widths were determined from FIGS. 8A to 8C. While the half width of the CsI needle crystal film that was thin relative to the thicknesses of the prepared porous scintillator crystals was 400 µm, the half width of the CuI-based scintillator crystal having a void ratio of 8%, that of the CuI-based scintillator crystal having a void ratio of 32% and that of the CsBr-based scintillator crystal were 298 µm, 217 µm and 340 µm respectively.

When the radiation detector was configured so as to arrange resin that serves as a protective layer between the porous scintillator crystal and the photodetector array without any gap, an improvement of the output of the photodetector array was confirmed. This indicates that it is also preferable to adopt a layered structure considering sending out light from the porous scintillator crystal to the photodetectors.

From the above, it was confirmed that a porous scintillator crystal according to the present invention had a half width that is sufficiently narrower than or equivalent to that of the Comparative Example, in spite of the fact that the porous scintillator crystal according to the present invention had a thickness sufficiently thicker than that of Comparative Example. Thus, as a result, a porous scintillator crystal according to the present invention proved to be used as a scintillator having a sufficient thickness without degrading the spatial resolution. This means that the voids introduced in a uniaxial direction of a porous scintillator crystal effectively operate for guiding light because the porous scintillator crystal is made of a single crystal along the lateral surfaces of the voids.

Industrial Applicability

A porous scintillator crystal according to the present invention emits light when excited by radiation and has a function of guiding the emitted light so that the porous scintillator crystal can effectively be employed to form a radiation detector without partitions when combined with photodetectors. Particularly, a porous scintillator crystal according to the present invention can find applications in the field of measurement instruments utilizing radiation, such as X-rays, for medical, industrial, high energy physical, and aerospace.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese patent Applications No. 2011-074988, filed Mar. 30, 2011, and No. 2012-054354, filed Mar. 12, 2012, which are hereby incorporated by reference herein in their entirety.

REFERENCE SIGNS LIST 11 void
12 porous scintillator crystal
13 void diameter
14 nearest-neighbor distance of voids
15 thickness of porous scintillator crystal
16 direction of thickness of voids
17 thickness of voids
18 first principal plane
19 second principal plane
21 heater section
22 water cooling section
23 sample
71 radiation detector
72 photodetector
73 substrate

The invention claimed is:

1. A porous scintillator crystal comprising a porous structure, wherein the porous structure is a phase-separated structure in which a plurality of independent voids are formed and at least one void in the porous structure extends in a direction perpendicular to a plane of the porous scintillator crystal, and
wherein the phase-separated structure includes a single crystalline phase that forms a matrix continuously surrounding outer peripheries of the plurality of independent voids.

2. The porous scintillator crystal according to claim 1, wherein the porous structure comprises CuI or CsBr.

3. The porous scintillator crystal according to claim 2, wherein the porous structure comprises one or more materials other than CuI or CsBr.

4. The porous scintillator crystal according to claim 1, wherein an average of nearest-neighbor distances of the voids is not less than 500 nm and not more than 50 µm.

5. The porous scintillator crystal according to claim 1, wherein the porous structure emits light when the porous structure is excited by radiation.

6. The porous scintillator crystal according to claim 1, wherein the porous structure totally reflects light emitted therein by an interface between the porous structure and the void.

7. The porous scintillator crystal according to claim 1, further comprising a first plane and a second plane that are not located on a same plane, wherein the porous structure continuously exists from a part of the first plane to a part of the second plane.

8. A radiation detector comprising a photodetector and a porous scintillator crystal arranged to face the photodetector, wherein the porous scintillator crystal is a porous scintillator crystal according to claim 1.

9. The radiation detector according to claim 8, wherein a protective layer is arranged between the photodetector and the porous scintillator crystal.

10. A method of manufacturing a porous scintillator crystal, comprising a step of forming a structural body including a phase-separated structure having a plurality of first crystal phases with unidirectionality and a second crystal phase covering lateral surfaces of the first crystal phases and a step of removing the first crystal phases of the structural body to form voids.

11. A porous scintillator crystal manufactured by the method according to claim 10.

12. The porous scintillator crystal according to claim 11, further comprising a first plane and a second plane that are not located on a same plane, wherein the second crystal phase continuously exists from a part of the first plane to a part of the second plane.

13. The porous scintillator crystal according to claim 11, wherein the second crystal phase totally reflects light emitted therein by an interface between the second crystal phase and a void.

14. The method according to claim 10, wherein a material of the first crystal phases and a material of the second crystal phases are capable of forming a eutectic phase-separated structure.

15. The method according to claim 10, wherein the step of forming the structural body comprises unidirectionally solidifying a melt of mixture of a material of the first crystal phases and a material of the second crystal phases.

16. The method according to claim 10, wherein the phase-separated structure comprises a eutectic composition of the first crystal phases and the second crystal phases.

* * * * *